United States Patent Office 3,394,983
Patented July 30, 1968

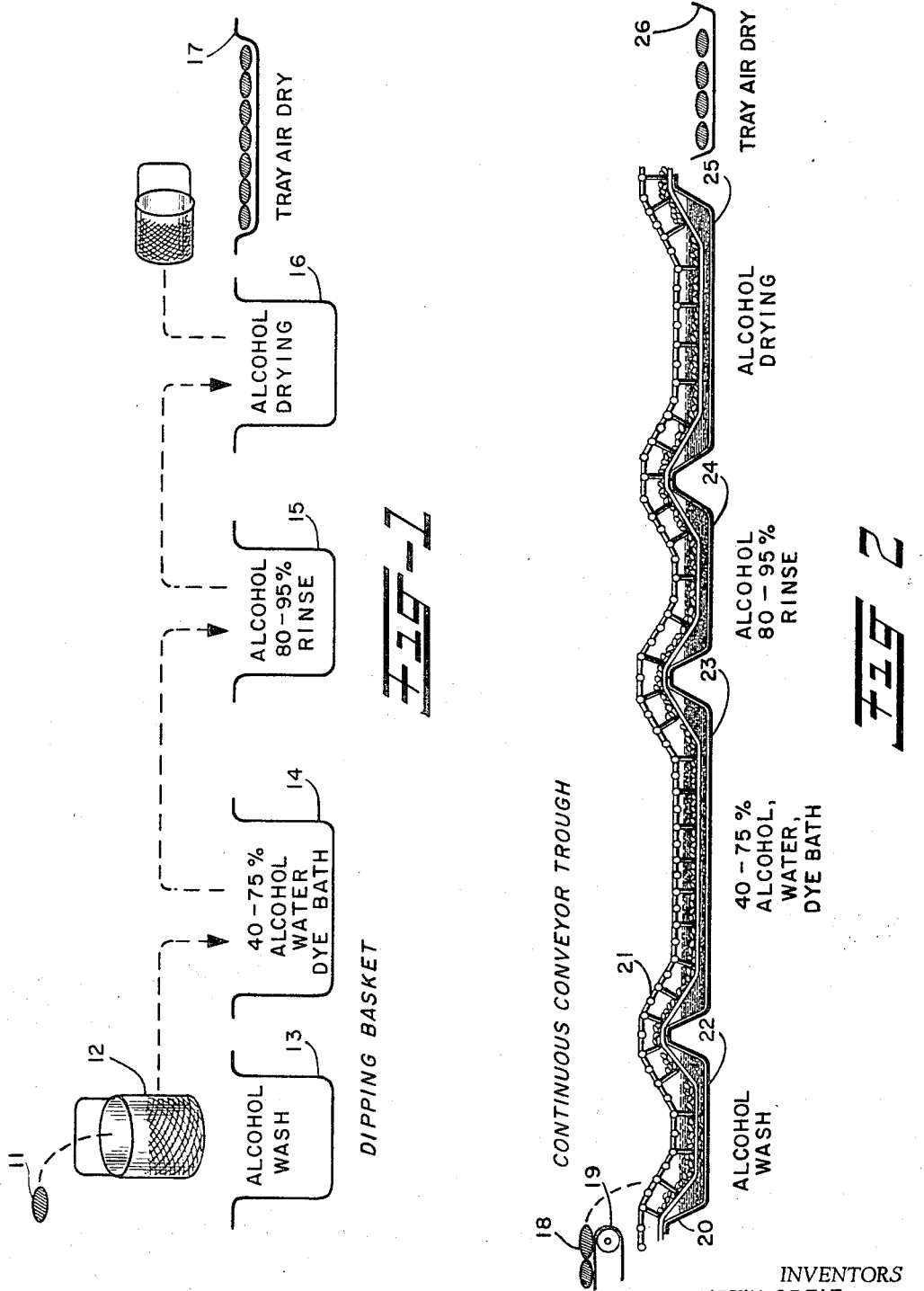

3,394,983
DIP-DYEING CAPSULES
Martin Greif, Bronx, Ernest Chu Yen, Orangeburg, James G. Vincent, Jr., West Nyack, and Lloyd Frank Hansen, New City, N.Y., assignors to American Cyanamid Company, Stamford, Conn., a corporation of Maine
Filed June 14, 1963, Ser. No. 287,827
3 Claims. (Cl. 8—4)

ABSTRACT OF THE DISCLOSURE

Filled-gelatin capsules, either hard or soft shell, are immersion dyed to uniformly color the outside only of the capsules by immersion in a 40% to 90% non-toxic water-miscible volatile organic solvent-water solution of a non-toxic dye. The quantity of dye is greatly reduced over dyeing the gelatin of the capsule throughout. An isopropanol-water solution for 1 to 16 minutes at 25 to 30° C. with an alcohol drying rinse in dry isopropanol is preferred.

---

This invention relates to immersion dyeing of gelatin capsules in a solution of a non-toxic water-alcohol soluble dye in a water-miscible volatile organic solvent-water solution.

For purposes of identification, to prevent confusion within the industry and by the patient, and to assist in preventing unauthorized substitution, it is desirable that gelatin capsules have an identifying color configuration. In the past it has been customary to color capsules by manufacturing the capsules from a colored gelatin strip in which the gelatin composition used for making the soft gelatin capsules or the gelatin dipping composition for hard shell capsules was colored throughout so as to give a capsule, the entire shell of which was uniformly colored.

We have found that to reduce the dye consumption and hence the cost of the dye, and also reduce the amount of dye which is ingested by a user, pharmaceutically elegant capsules can be manufactured by dyeing only the surface of the capsules, after filling and sealing the capsules. To secure uniformly colored capsules, a uniform dyeing is necessary. Newly formed gelatin capsules are very fragile and must be carefully treated in dyeing.

The present process of dyeing may be used on (A) soft gelatin capsules which are still substantially moist after their manufacture, (B) soft gelatin capsules which have been dried before the dyeing step, and (C) hard shell capsules whose shells are either adhesively or frictionally held together sufficiently tightly that the capsules do not part during treatment. If frictionally united at the start, dye penetrates into the joint of hard shells, and adhesively unites the shells.

The dyeing is readily accomplished on bare gelatin capsules or gelatin capsules which have identifying indicia on their surface. The identifying indicia may be embossed by pressure or heat or may be a pigment on the surface or may be a previous patterned dye. The indicia most commonly used are trade marks, drug identification, and dosage levels, but obviously indicia of choice giving any desired information within the limits of space available may be used.

With particular reference to the soft gelatin capsules, the gelatin formula may be prepared using such methods and compositions as described in United States Patent 2,799,591, Michel and Knight, "Rapid Preparation of Encapsulation Formula," July 16, 1957; 2,799,592, Hansen and Weidenheimer, "Rapid Preparation of Encapsulation Mixture," July 16, 1957; or 2,720,463, Stirn and Taylor, "Gelatin Capsule Casting Composition Preparation," Oct. 11, 1955. The capsules can be formed on machines such as described in United States Patent 2,697,317, Stirn and Taylor, "Capsule Forming Die Roll," Dec. 21, 1954, or by other means. The gelatin of the capsule itself may have pigments or dyes incorporated therein.

The capsules after forming and filling are frequently dusted with stearyl alcohol to keep them from sticking to each other. If so dusted, or if the capsules are oily, the capsules should be rinsed in solvent. A short rinse is adequate although a longer rinse does no harm.

The rinsed capsules are then dipped in a dye solution. It is preferred that a lower alkanol-water solution be used. Methanol is toxic but otherwise satisfactory. Ethanol in the United States bears an expensive tax burden but otherwise is excellent. The propanols give excellent results. Isopropanol is usually preferred. t-Butyl alcohol is usually slower drying than is desired but otherwise gives good results. Acetone, dimethylformamide, water-miscible higher volatile ketones, or mixtures of the above solvents may be used. An alcohol-water solution is preferred. From 40 to 90% isopropanol, by volume, with water is an excellent compromise between availability, cost and operating convenience.

Any dye of a desired color which exhibits solubility in water-alcohol solvent systems gives good results. The more soluble and stronger dyes are preferred for more intense coloration. The dyes which are presently acceptable for food and drug use are described in an article entitled "Colors for Food, Drugs and Cosmetics," published in the Encyclopedia of Technology, The Interscience Encyclopedia, Inc., 1949, vol. 4, pages 287–313. For internal usage these approved dyes are obviously the dyes of choice.

The concentration of the dye can vary over wide limits. The concentration is preferably in the soluble range for the dye being used. A concentration of dye is preferred such that the desired depth of color is obtained in from 1 to about 15 minutes at a temperature between 25 and 30° C. If the time is too short, the coloring may be mottled, and if too long, processing is slow and the capsules are excessively softened. A small quantity of a wetting agent promotes a more even dye penetration, especially if the pre-washing leaves some residual stearyl alcohol. From about 0.0005 to 0.1% of sodium bis(2-ethylhexyl) sulfosuccinate is preferred because its lack of toxicity has been so well established. Other non-ionic or anionic wetting agents described in the text "Detergents and Emulsifiers 1963 Annual," John W. McCutcheon, Inc., 236 Mount Kemble Ave., Morristown, N.J., 1963, can be used. Again, wetting agents known to be non-toxic are preferred, as are those which are non-reactive towards the dyes being used.

After dyeing the capsules are rinsed, preferably in a 90% solvent-water solution to remove excess dye on the surface and prevent spotting or uneven dyeing from exposure to remaining droplets of dye, and then the capsules are dipped in dry solvent to assist in dehydrating. Preferably but not necessarily the same solvent is used throughout. Although dipping for a few moments frequently gives adequate dehydration, immersion for an hour gives better dehydration, so less subsequent drying is required.

The capsules are then spread in trays to permit the remaining water and solvent to evaporate. The dried capsules may be dusted with stearyl alcohol and packaged in accordance with conventional procedures.

The present process gives a greater sheen to the capsules, that is the capsules are shinier, than if the capsules are dyed while moist immediately after formation. Extremely shiny capsules can be obtained by first drying soft gelatin capsules and then dip-dyeing in accordance with this invention.

Because the range of intensity of colors desired and the strength of the various acceptable dyes varies over such a wide range, the dye present in the final capsule may vary over corresponding ranges. For comparable colored capsules, however, from 25% to around 6% of the quantity of dye used with bulk-dyed gelatin gives the same surface coloration. The difference is only apparent on cutting open the capsule, or abrading the surface.

The capsules can be dyed wet or can be dyed after drying and even after storage for periods of several months. Hence, capsules which are colorless or pigmented in the strip or dyed one color can be additionally dyed to give a different appearance.

After the final operation the capsules may be polished with an alcoholic benzoin solution or alcoholic ethyl cellulose solution to improve the surface appearance and give a degree of moisture resistance as may be required if stored in moist places.

Two machines which can be used with the present process are diagrammatically illustrated in the accompanying drawings in which:

FIGURE 1 shows a basket dipping procedure diagrammatically.

FIGURE 2 shows a continuous conveyor dipping system.

As shown in FIGURE 1, capsules 11 are placed in a perforated basket 12, which is only partially filled so that the capsules may be tumbled therein. The basket containing the capsules is then dropped into a wash tank 13 and agitated therein until the capsules have been washed free from surface dirt and oil and stearyl alcohol, if used as a lubricant. About a minute is usually adequate. The basket is lifted out of the wash tank, permitted to drain, and then immersed in the dye bath tank 14. The capsules are agitated in the basket in the dye bath tank until the depth of color is as desired, lifted out, permitted to drain, and the basket is then lowered into the rinse tank 15, shaken until the capsules are rinsed and the basket lifted out and permitted to drain. The basket is then lowered into the drying tank 16 where the capsules are permitted to remain in dry solvent until a part of the moisture in the shell is extracted by the solvent, which may be from a few minutes to an hour or more, lifted out of the drying tank 16, permitted to drain and the capsules are then spread in trays 17 in a single layer and dried in a low humidity room until the solvent and moisture content reach a desired terminal level.

Whereas the tanks and the baskets are shown diagrammatically, it is obvious to those skilled in the art that the baskets may be immersed by hand or that in larger scale operations conventional automatic dipping machines may be used to drop the basket into each of the tanks, agitate for a desired period, lift out, hold for a few seconds to drain, and transfer to the next tank. The choice of automated equipment is within the skill of the art and depends on equipment available, labor cost, and the proposed size and required flexibility of operations.

In FIGURE 2 is shown a diagrammatic sketch of an automatic machine in which the capsules 18 are fed along an automatic conveyor 19 and dropped onto a trough 20. The capsules are pushed along the trough by a chain conveyor 21 and as they are pushed along, the conveyor dips the capsules successively into the wash tank 22, the dye bath tank 23, the rinse tank 24, the drying tank 25 and drops the capsules into trays 26. The chain conveyor is preferably endless and returns to the point of origin under the tanks. Conventional trough-type chain conveyors are used for the process with the length of each tank chosen such that the capsules remain in such tank for a desired period of time.

Obviously the solutions in the various tanks may be continuously or intermittently changed to keep the solutions at desired concentrations with fresh solvent or dye or water added as necessary and with the solvents being recovered for reuse as is standard in the industry.

EXAMPLE 1

Using a basket which would conveniently contain 500 capsules while leaving room for agitation (that is, not more than about half filled), 500 soft gelatin capsules were prepared using the formulation described in Example 5 of United States Patent 2,799,591, except that the colored dyes and pigments were omitted. The capsules were formed as described in United States Patent 2,697,317, tumbled 45 minutes to smooth the configuration and partially dry the capsules, placed in the basket, and then immersed in a dye solution containing 0.2% FD&C Green No. 3 dye (weight/volume) in a 75% isopropanol–25% water (volume/volume) mixture and agitated for 5 minutes. After 5 minutes the basket was removed, drained for about 30 seconds, immersed in a 90% isopropanol-water solution (v./v.) with agitation for about 1 minute, removed, drained for 30 seconds and immersed in an anhydrous isopropanol bath and allowed to remain with occasional shaking for an hour, removed, drained for 30 seconds, dusted with 5 grams of powdered stearyl alcohol and spread in trays to dry.

The solutions were all in a room at 25° C. and the drying was conducted at 10% relative humidity.

Assays of the dyed capsules showed that each capsule contained 0.237 milligram of FD&C Green No. 3.

The capsules, in color, matched capsules made with a gelatin formula containing dissolved FD&C Green No. 3 dye having 0.849 milligram of FD&C Green No. 3 dye per capsule.

EXAMPLE 2

Capsules made as in Example 1, and having titanium dioxide in the film as a pigment, were tray-dried following manufacture. The capsules were then washed in isopropanol to remove stearyl alcohol lubricant, and dip dyed at 25° C. in a solution containing 0.2% FD&C Green No. 3 (w./v.) in a solvent composed of 75% isopropanol–25% water (v./v.) The dipping time in the dye solution was varied with the following results:

| Dipping time (min.): | Percent green dye in gelatin shell |
| --- | --- |
| 1 | 0.04 |
| 2 | 0.06 |
| 4 | 0.08 |
| 8 | 0.12 |
| 16 | 0.13 |

The intensity of the green color increased as the dyeing time and dye absorption increased. The group of capsules containing 0.13% based on the weight of the gelatin formula in appearance matched capsules containing 0.50% of dye uniformly dispersed through the gelatin film.

EXAMPLE 3

Using a series of troughs, held at 25° C., such as shown in FIGURE 2, the wash tank was filled with isopropanol. The dye tank was filled with 0.2% FD&C Violet No. 1 (w./v.) in a 75% isopropanol–25% water (v./v.) solvent, the rinse tank filled with 90% isopropanol and the drying tank filled with anhydrous isopropanol. The conveyor was run at such a speed that the capsules were kept in the dyeing tank for the times indicated. The dried capsules prepared, as in Example 2, but containing titanium dioxide pigment in the film were found to have absorbed the following quantities of dye.

| Dyeing time (min.): | Percent dye in gelatin shell |
| --- | --- |
| 1 | 0.010 |
| 2 | 0.020 |
| 4 | 0.025 |
| 8 | 0.040 |
| 16 | 0.040 |

The final color of the capsules held for 8 or 16 minutes matched the color and shade of a gelatin capsule containing 0.175% of dye uniformly dispersed through the gelatin shell.

EXAMPLE 4

The runs of Examples 2 and 3 were repeated with all solutions at 30° C. The absorption of color was somewhat faster. Either a lower dye concentration or a shorter immersion time gives capsules of the same final color.

EXAMPLE 5

Example 3 was repeated using the tanks at 30° C. and using ethanol. The capsules were uniformly colored.

Technically, ethanol gives excellent results. Commercially, tax problems on ethanol present an obstacle.

EXAMPLE 6

Dry soft shell gelatin capsules containing titanium dioxide in the gelatin formulation were placed in a small wire mesh basket. The basket was immersed in isopropanol for one minute, and drained for 30 seconds. The basket was then immersed in a path containing a dye solution composed of 0.05% (w./v.) of FD&C Violet No. 1 in 70% isopropanol–water (v./v.) for 30 seconds. The basket was removed and the capsule rinsed for 10 seconds with 90% isopropanol, drained, and placed in substantially anhydrous isopropanol for 15 minutes, and air dried. The capsules dried with a mottled appearance.

EXAMPLE 7

The procedure of Example 6 was repeated incorporating 0.0005% sodium bis(2-ethylhexyl) sulfosuccinate in the dye solution. Upon drying, the capsules showed an even appearance.

EXAMPLE 8

The procedure of Example 7 was repeated incorporating 0.1% of polyoxyethylene sorbitan monolaurate (Tween 20) in the dye solution. The capsules evidenced an even appearance.

EXAMPLE 9

Soft shelled gelatin capsules were produced with one-half of the shell pigmented with 0.05% (w./w.) charcoal. Both halves contained 1.0% (w./w.) titanium dioxide. The white side was pre-printed using the procedure described in United States Patent 2,821,821, supra. The capsules were tray dried in the conventional manner. The capsules were washed and samples were dyed by hand according to the procedure of Example 7 using a dye bath composed of FD&C Green No. 3 0.05% (w./v.) and FD&C Yellow No. 5 0.01% in 70% isopropanol-water (v./v.). Two batches were dyed in succession for immersion times of 45 seconds and 60 seconds, respectively. Two-tone green printed capsules were produced.

EXAMPLE 10

Seven batches of dry gelatin capsules of the composition described in Example 9 were dyed in standard dye solutions containing 0.2% (w./v.) of the dye listed in 70% isopropanol in water (v./v.). The following dyes were used.

FD&C Violet No. 1
FD&C Blue No. 1
FD&C Green No. 3
FD&C Yellow No. 6
FD&C Yellow No. 5
FD&C Red No. 2
FD&C Red No. 4

The immersion time for each batch was 1 minute. Seven distinctive two-tone capsule batches were obtained.

EXAMPLE 11

The procedure of Example 10 was repeated using dry capsules in which one-half the shell contained titanium dioxide and the other half red iron oxide. No printing was used. The red dyes produced two-tone capsules with dark and light red halves. The yellow dyes produced yellow and orange colored halves. The blue, violet and green dyes yielded capsules in which one-half was colored blue, violet, and green, respectively, while the other half was substantially black.

EXAMPLE 12

The procedure of Example 11 was repeated using hard shell capsules, the two pieces of which were pigmented with titanium dioxide and red iron oxide, respectively. The halves fitted frictionally, and did not separate in the dyeing operation. The halves were adhesively united after drying.

We claim:
1. The method of surface dyeing filled, edible moist soft gelatin capsules without unduly dissolving the surface of the capsules, or hydrolyzing the same, which comprises:
 (a) immersing filled, edible moist soft gelatin capsules in a solution of a non-toxic dye in from 40% to 90% (v./v.) of a non-toxic water-miscible volatile organic solvent selected from the group consisting of 1 to 4 carbon alkanols, dimethylformamide and water-miscible volatile ketones in water,
 (b) for a time of from about 1 minute to about 16 minutes, within the temperature range of about 25° C. to about 30° C., so that the capsules are colored to a desired depth, while retaining strength and essentially tack-free characteristics,
 (c) separating the capsules from said dye solution,
 (d) rinsing the capsules with additional solvent,
 (e) then immersing in essentially anhydrous said volatile organic solvent, thereby at least partially dehydrating the capsules, and
 (f) drying the capsules in air.
2. The process of claim 1 in which the volatile organic solvent is isopropanol.
3. The process of claim 2 in which the dye solution additionally contains from about 0.0005 to 0.1% (w./v.) of a non-toxic surfactant.

References Cited

UNITED STATES PATENTS

| | | | |
|---|---|---|---|
| 2,304,673 | 12/1942 | Bentley | 8—3 |
| 2,322,968 | 6/1943 | Rickus | 8—3 |
| 1,938,169 | 12/1933 | Barr | 118—400 |
| 1,616,397 | 2/1927 | Theiss | 118—400 |
| 2,121,021 | 6/1938 | Cornwell | 8—4 |
| 2,260,543 | 10/1941 | Smith | 8—4 |
| 2,624,163 | 1/1953 | Stirn | 167—83 X |
| 2,727,833 | 12/1955 | Ren et al. | 167—83 |
| 2,780,355 | 2/1957 | Palermo et al. | |
| 2,821,821 | 2/1958 | Yen. | |

OTHER REFERENCES

Tuckerman et al.: J. Nat. Pharm. Assoc., vol. 2, No. 3, pp. 60–61.

NORMAN G. TORCHIN, *Primary Examiner.*

D. LEVY, *Assistant Examiner.*